US006819313B2

(12) United States Patent
Abdelhadi et al.

(10) Patent No.: US 6,819,313 B2
(45) Date of Patent: Nov. 16, 2004

(54) USER INTERACTIVE CURSOR CONTROL IN A COMPUTER CONTROLLED DISPLAY SYSTEM WITH SUPPLEMENTAL MOUSE LIGHTING TO AID IN CURSOR POSITIONING

(75) Inventors: Sanaa F. Abdelhadi, Austin, TX (US); Hypatia Rojas, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 09/801,616

(22) Filed: Mar. 8, 2001

(65) Prior Publication Data
US 2002/0126088 A1 Sep. 12, 2002

(51) Int. Cl.[7] .................................................. G09G 5/08
(52) U.S. Cl. ...................... 345/157; 345/156; 345/158; 345/163; 345/173; 345/175; 348/569; 340/825.19
(58) Field of Search ................................. 345/156, 157, 345/163, 173, 158, 175, 145; 340/325.19; 348/569, 520, 552

(56) References Cited

U.S. PATENT DOCUMENTS

| 5,701,175 A | * | 12/1997 | Kostizak et al. ............ 356/326 |
| 5,841,425 A | * | 11/1998 | Zenz, Sr. .................... 345/163 |
| 5,877,748 A | * | 3/1999 | Redlich ...................... 345/163 |
| 5,929,840 A | * | 7/1999 | Brewer et al. .............. 345/862 |
| 6,172,354 B1 | * | 1/2001 | Adan et al. ................. 250/221 |
| 6,249,809 B1 | * | 6/2001 | Bro ............................. 709/217 |
| 6,292,172 B1 | * | 9/2001 | Makhlouf ..................... 714/31 |
| 6,295,051 B1 | * | 9/2001 | Kanevsky et al. .......... 345/163 |
| 6,323,844 B1 | * | 11/2001 | Yeh et al. ................... 345/166 |
| 6,486,873 B1 | * | 11/2002 | McDonough et al. ....... 345/163 |
| 2002/0033795 A1 | * | 3/2002 | Shahoian et al. ........... 345/156 |

\* cited by examiner

Primary Examiner—Bipin Shalwala
Assistant Examiner—Vincent E. Kovalick
(74) Attorney, Agent, or Firm—Diana L. Roberts; Jerry Kraft

(57) ABSTRACT

A visual indication on a cursor control device is triggered when the cursor is within a designated region on said display screen. Usually the user activated cursor control device is a computer control mouse, but the invention may operate effectively with joy sticks and trackballs.

An effective implementation provides a light on the control mouse and the target region on the display screen for the cursor is an icon. The light on the mouse may be a variable light. It may be varied dependent upon the type of region on the screen which is the target region, e.g. one type of light if the target region is a display window and another type of light if the target region is an icon. The variation in the light may be light intensity or color.

30 Claims, 5 Drawing Sheets

USER INTERACTIVE CURSOR CONTROL IN A COMPUTER CONTROLLED DISPLAY SYSTEM WITH SUPPLEMENTAL MOUSE LIGHTING TO AID IN CURSOR POSITIONING

TECHNICAL FIELD

The present invention relates to user interactive computer supported display technology and particularly to such user interactive systems and methods which are user friendly and provide visually impaired and even unsophisticated computer users with an interface environment which is easy to use, particularly with respect to screen cursor movements.

BACKGROUND OF RELATED ART

The past decade has been marked by a technological revolution driven by the convergence of the data processing industry with the consumer electronics industry. This advance has been even further accelerated by the extensive consumer and business involvement in the Internet over the several years. As a result of these changes, it seems as if virtually all aspects of human endeavor in the industrialized world require human-computer interfaces. As a result of these profound changes, there is a need to make computer directed activities accessible to a substantial portion of the world's population which, up to a few years ago, was computer-illiterate, or at best computer indifferent. In order for the vast computer supported market places to continue and be commercially productive, it will be necessary for a large segment of consumers who are limited in computer skills to become involved with computer interfaces.

Despite all of the great changes which have been made in the computer industry, the screen cursor controlled manually by the user still remains the primary human-computer interface. The user still commands the computer primarily through manual pointing devices such as mice, joy sticks and trackballs which control the on-screen cursor movements. It must be noted that the principles involved in such pointing devices developed a generation ago when most of the people involved in interfaces to computer were computer professionals who were willing to invest great amounts of time in developing computer skills. It is very possible that had computers originally been the mass consumer, business and industry implements which they are today, user interfaces which were much easier and required less skill to use would have been originally sought and developed. Nonetheless, the manually controlled cursor movement devices are our primary access for cursor control. The present invention is directed to making mouse, trackball and the like cursor control devices more user friendly and effective.

Cursor control devices, such as the mouse, translate relatively precise orthogonal manual movements into precise cursor movements on the display screen. Users with poor hand-eye coordination due to poor eyesight, physical impairment, feebleness or other dexterity problems find the computer mouse to be quite stressful and frustrating.

In addition, the computer has been found to be most effective as a work saving device in situations requiring a user to interface with the display for a limited number of repetitive functions. In the work place, these repetitive functions may be performed by people of very limited computer interface skills and dexterity. Since such users or operators would have limited mouse skills, it would be advantageous to have the ability to optimize the effectiveness of user manual orthogonal movements in performing the repetitive functions.

SUMMARY OF THE PRESENT INVENTION

The present invention is directed to interactive computer controlled display systems and particularly to systems for controlling cursor movement on the display screen. There is provided a user activated cursor control device, such as a trackball or mouse, which is movable in the four orthogonal directions. The control device is connected to the computer which includes means for converting the user activated orthogonal movements into cursor movements in said four directions. The key to the present invention is in the provision of a visual indication on the cursor control device when the cursor is within a designated region on said display screen. Usually, the user activated cursor control device is a computer controlled mouse, but the invention may operate effectively with joy sticks and trackballs.

An effective implementation provides a visual indication comprising a light on the control mouse, and the target region on the display screen for the cursor is an icon. The light on the mouse may be a variable light. It may be varied, dependent upon the type of region on the screen which is the target region, e.g. one type of light if the target region is a display window and another type of light if the target region is an icon. The variation in the light may be light intensity or color.

In accordance with another aspect of the invention, the nature of the light may be varied as the cursor approaches the designated or target region. For example, the light may be intermittent or flashing as the target region is approached and steady once the target region is reached.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
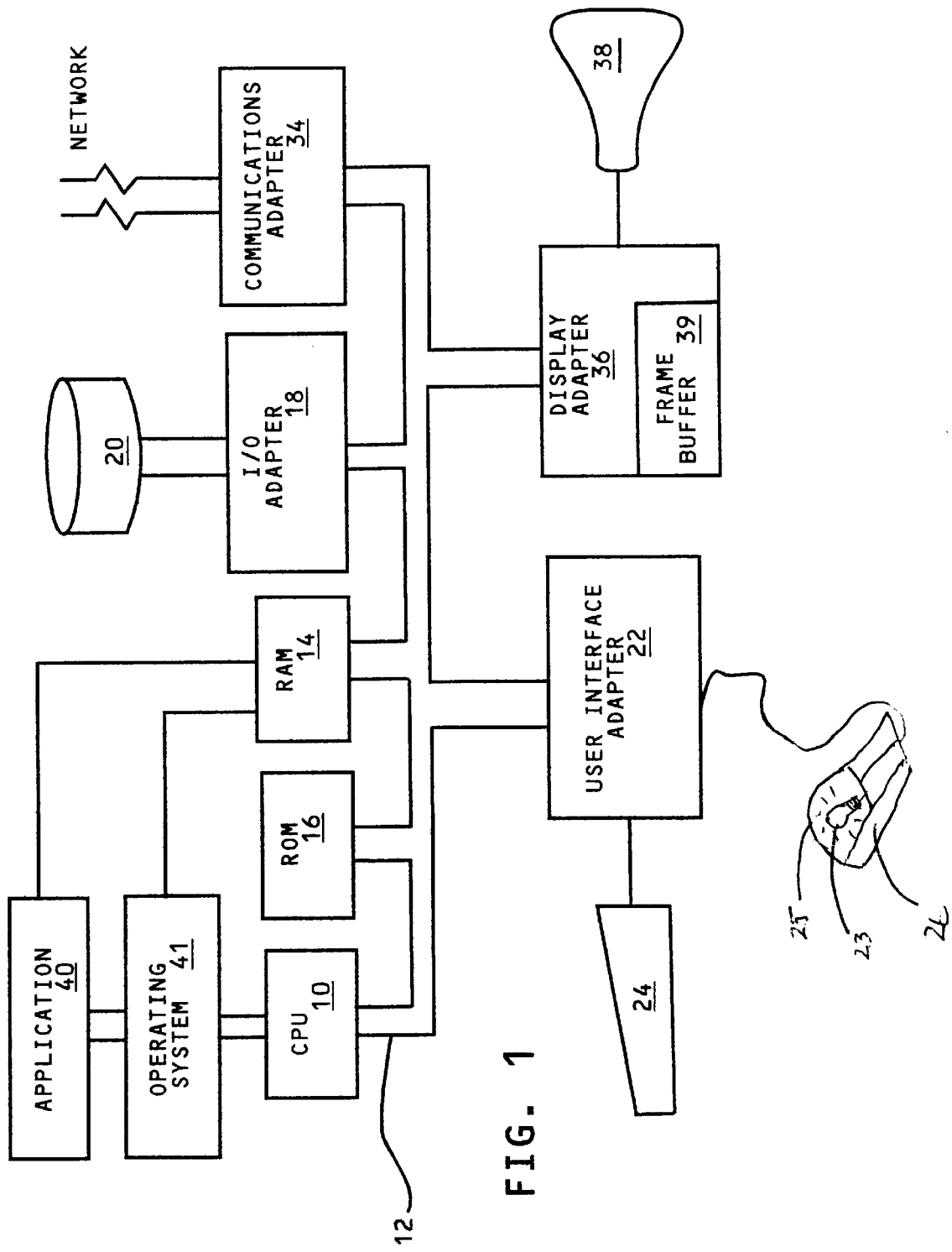
FIG. 1 is a block diagram of a generalized data processing system including a central processing unit which provides the computer controlled interactive display system with the lightable mouse which may be used in practicing the present invention.

Referring to FIG. 1, a typical data processing system is shown which may function as the computer controlled display terminal used in implementing the system of the present invention of selectively lighting the computer mouse so as to aid the user in controlling on-screen cursor movements. A central processing unit (CPU) 10, such as any PC microprocessor in a PC available from IBM or Dell Corp., is provided and interconnected to various other components by system bus 12. An operating system 41 runs on CPU 10, provides control and is used to coordinate the function of the various components of FIG. 1. Operating system 41 may be one of the commercially available operating systems such as Microsoft's Windows98(™) or WindowsNT(™), as well as the UNIX or AIX operating systems. An application program which controls the lighting of the mouse 23, to be subsequently described in detail, runs in conjunction with operating system 41 and provides output calls to the operating system 41, which in turn implements the various functions to be performed by the application 40. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a Small Computer System Interface (SCSI) adapter that communicates with the disk storage device 20, i.e. a hard drive. Communications adapter 34 interconnects bus 12 with an outside network enabling the data processing system to communicate with other such systems over a Local Area Network (LAN) or Wide Area Network (WAN), which includes, of course, the Internet. I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. The lighting of the mouse is provided through any light such as light 23 mounted within the mouse. A transparent or translucent dome 25 may be used to spread and balance the illumination of the light. The light 23 will be turned on and off based upon screen cursor position feedback information which will subsequently be described. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned mouse or related devices, a user is capable of inputting information to the system through the keyboard 24 or mouse 26 and receiving output information from the system via display 38.

Figure 2:
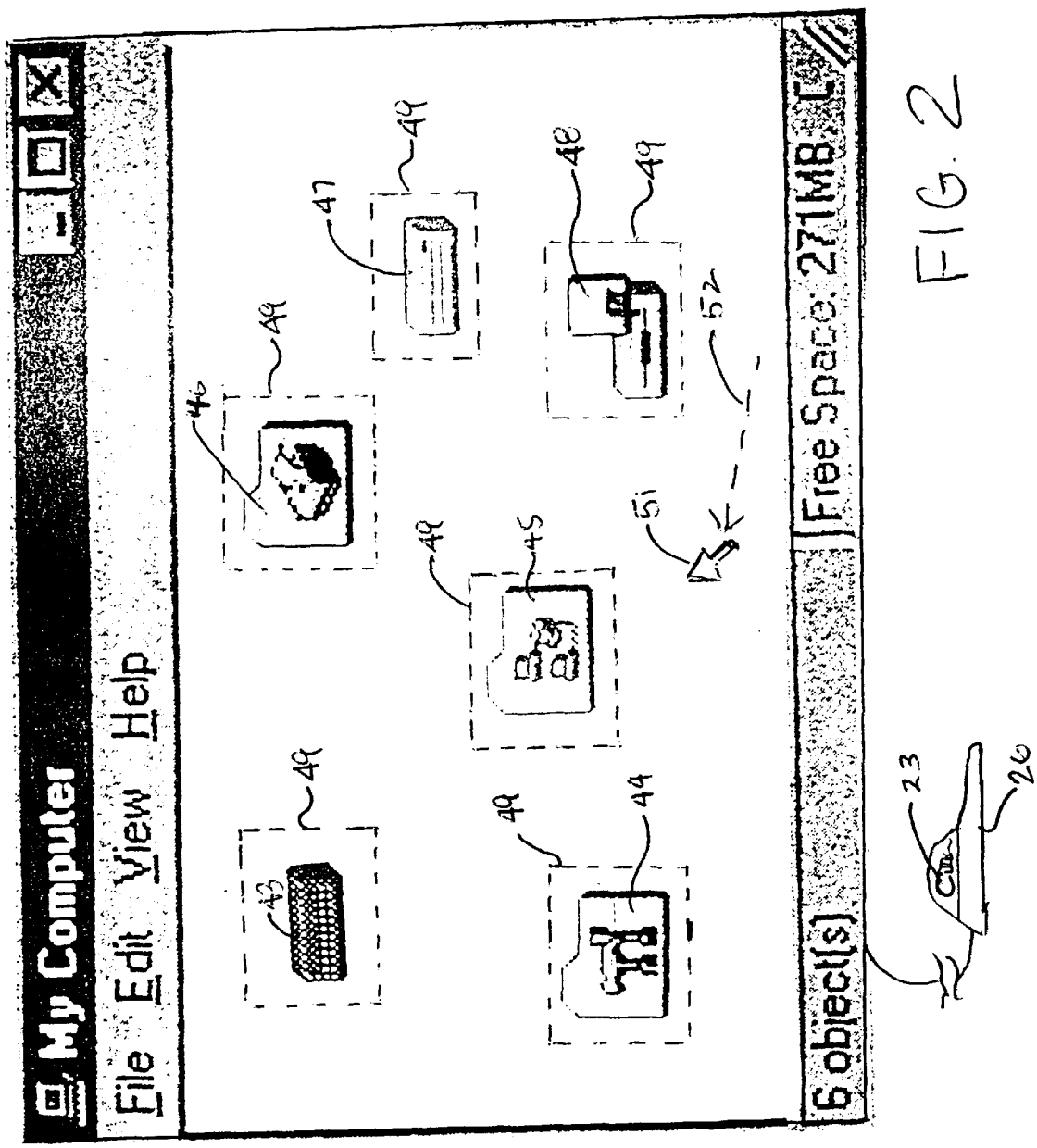
FIG. 2 is a diagrammatic view of a display screen illustrating the cursor movements into target regions which produce corresponding lighting of the mouse.
Figure 3:
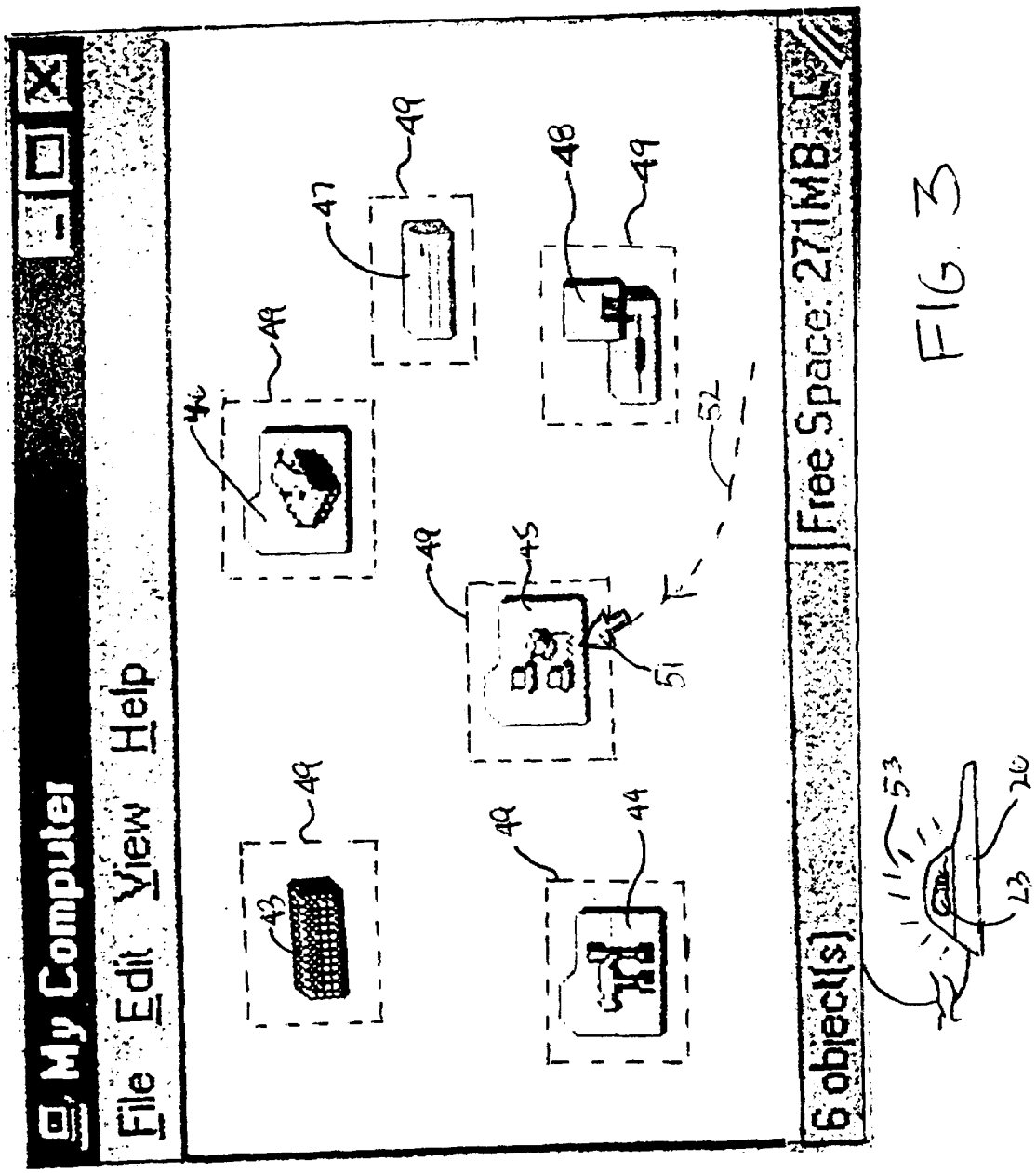
FIG. 3 is the diagrammatic display view of FIG. 2 but after the cursor has entered a target region which results in the lighting of the computer mouse.

In the diagrammatic illustration of FIG. 2, a display screen is shown with an arrangement of cursors 43 through 48. The mouse 26 is shown illustratively connected to the display screen. Each icon is surrounded by an enclosure or halo 49 which is set at a fixed distance from the icon proper. The halo 49 is shown in dashed lines because it defines a region which need not be shown on the display screen. Cursor 51 is shown moving along path 52. Then, when cursor 51 enters the region of an icon enclosed by halo 49, as shown in FIG. 3 with respect to icon 45, the light 23 in computer mouse 26 becomes illuminated 53.

There are many possible variations in the lighting of the cursor in order to get the attention of the user or to feedback other cursor/icon related information to the user. For example, the system may be programmed so that the mouse light 23 begins to blink when the moving cursor crosses halo 49, the light becomes a steady light when the cursor touches the actual icon. Alternatively, the mouse light could be varied in intensity as the icon region is approached.

Also, the feedback may be through lights of different colors. For example, the mouse could be readily set up with three lights of different colors. A routine could then be set up so that different types of regions on the screen could be designated, e.g. menu regions, window regions and icon regions. Then, dependent on the type of region that the on-screen cursor would enter, the corresponding color light in the mouse would be turned on.

Figure 4:
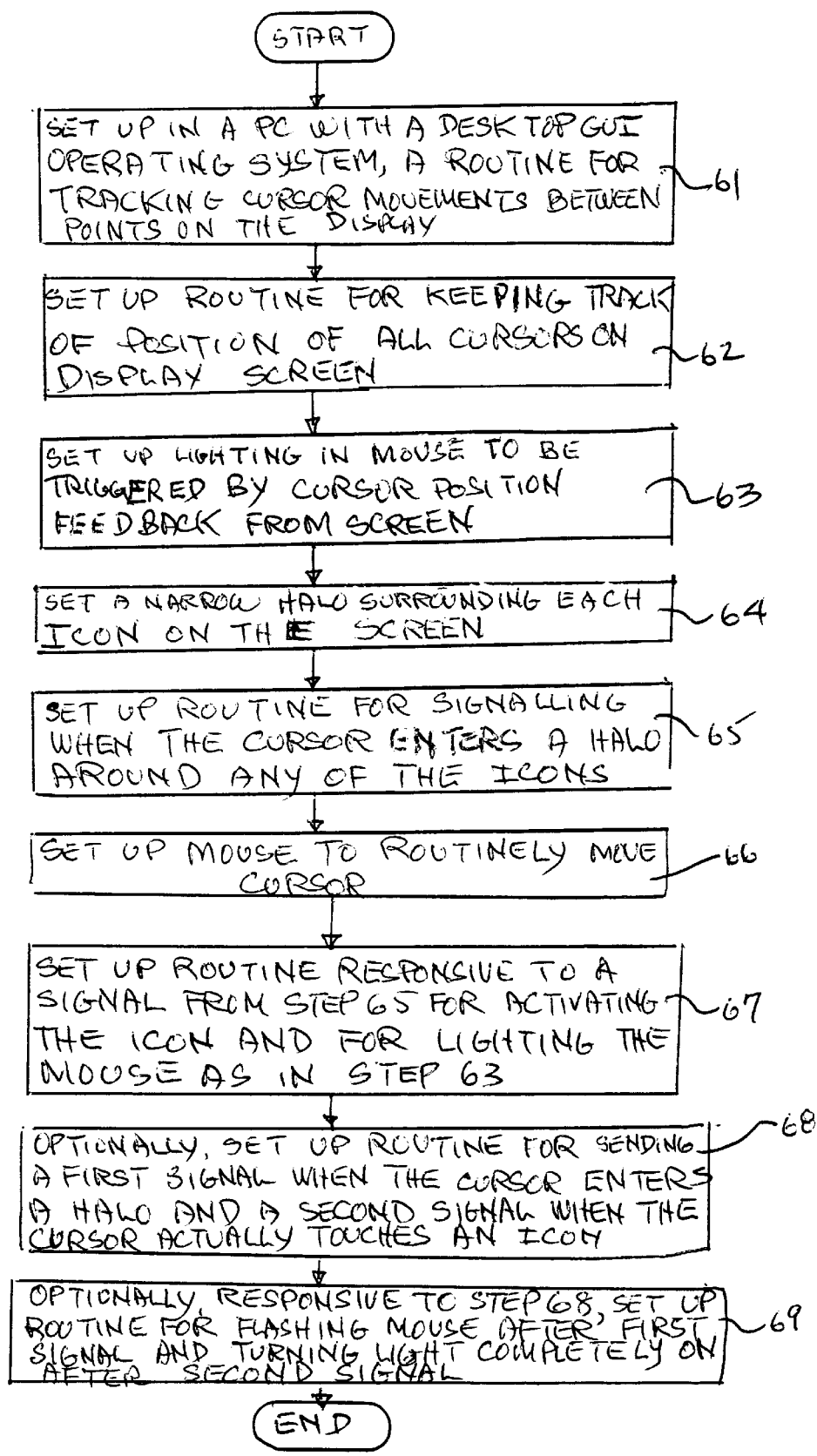
FIG. 4 is a flowchart of the program steps involved in setting up a system wherein cursor movement into designated regions on a display screen results in mouse illumination.
Figure 5:
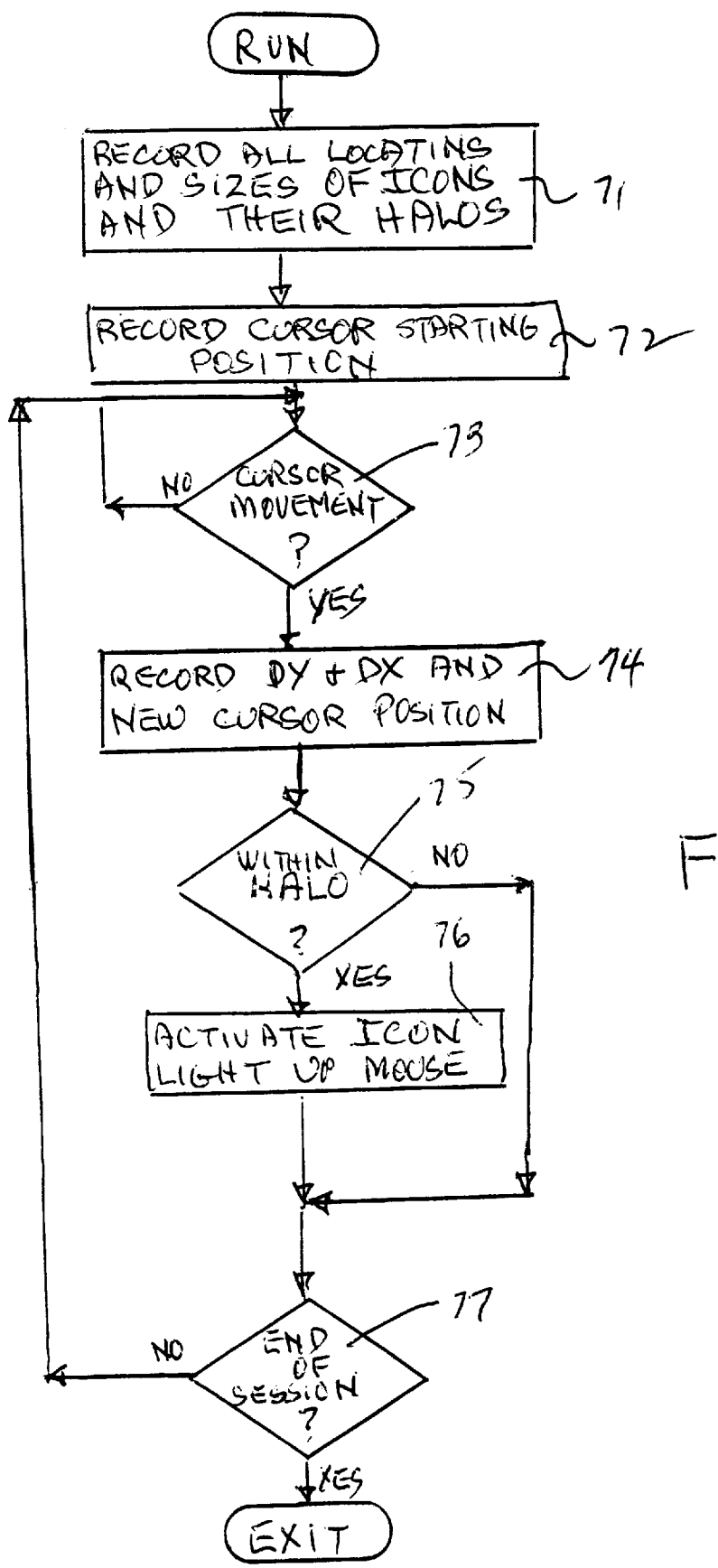
FIG. 5 is a flowchart of the steps involved in applying the system of the present invention to a cursor being moved by a user activated computer mouse.

Now, with reference to FIGS. 4 and 5, we will describe a process implemented by the present invention in conjunction with the flowcharts of these figures. FIG. 4 is a flowchart showing the development of a process according to the present invention for supplemental cursor control by an illuminated mouse. In a personal computer set up with a desktop Graphical User Interface (GUI) and an operating system, a routine is provided for tracking cursor movements between points on a display screen, step 61. A routine is provided for tracking cursor positions on the display screen, step 62. The mouse is provided with lighting and a routine is set up for lighting the mouse responsive to feedback that the cursor is in selected regions on the display screen, step 63. A narrow halo is set up surrounding each icon on the display screen, step 64. A routine is set up for signalling when the cursor enters a halo surrounding any of the icons, step 65. A mouse is set up with standard mouse movements, step 66. A routine is set up, step 67, which responsive to a signal from step 65, will activate the associated icon and light the mouse in accordance with step 63.

Optionally, a routine may be set up for sending a first signal when a cursor enters a halo around an icon and a second different signal when the cursor actually touches the icon, step 68. In response to optional step 68, a routine is set up for flashing the light on the mouse after the first signal and turning the mouse light fully on after the second signal, step 69.

The running of the process will now be described with respect to FIG. 5. First, step 71, the locations and sizes of all icons and their halos are recorded. The cursor starting position is recorded, step 72. A determination is made as to whether there has been any cursor movement, step 73. If No, the process is returned to step 73 and cursor movement is awaited. If Yes, there has been cursor movement, then the DX and DY of the cursor movement, the resulting new cursor position, are recorded, step 74. A determination is then made as to whether the new cursor position is within the halo, step 75. If Yes, the icon is activated and the mouse light is turned on to indicate this, step 76. Next, or if the determination from step 75 is No, a determination may be conveniently made here as to whether the session is at an end, step 77. If Yes, the process is exited. If No, the process is returned to step 73 and cursor movement is awaited.

One of the implementations of the present invention is as an application program 40 made up of programming steps or instructions resident in RAM 14, FIG. 1, during computer operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer controlled user interactive display having a graphical user interface, a system for controlling cursor movement on the display screen comprising:

a user activated cursor control device connected to said computer and movable in the four orthogonal directions, means in said computer for converting said user activated orthogonal movements into cursor movements in said four orthogonal directions on said display screen, and means for providing a visual indication on said cursor control device when said cursor is within a designated region on said display screen.

2. The system for controlling cursor movement of claim 1 wherein said user activated cursor control device is a computer control mouse.

3. The system for controlling cursor movement of claim 2 wherein said means for providing a visual indication comprises a light on said computer control mouse.

4. The system for controlling cursor movement of claim 3 wherein said designated region on said display screen is an icon.

5. The system for controlling cursor movement of claim 3 further including means for varying said light.

6. The system for controlling cursor movement of claim 5 wherein said means vary the light dependent upon the type of designated region said cursor is within.

7. The system for controlling cursor movement of claim 5 wherein said light is varied in intensity.

8. The system for controlling cursor movement of claim 5 wherein said light is varied in color.

9. The system for controlling cursor movement of claim 3 further including means for varying the light as the cursor approaches the designated region.

10. The system for controlling cursor movement of claim 9 wherein said means vary the light by providing an intermittent light pattern varying as the cursor approaches the designated region.

11. In a computer controlled user interactive display having a graphical user interface with a user activated cursor control device connected to said computer and movable in the four orthogonal directions, a method for controlling cursor movement on the display screen comprising:

providing a visual indication on said cursor control device when said cursor is within a designated region on said display screen.

12. The method of claim 11 wherein said user activated cursor control device is a computer control mouse.

13. The method of controlling cursor movement of claim 12 wherein said visual indication comprises lighting on said computer control mouse.

14. The method of controlling cursor movement of claim 13 wherein said designated region on said display screen is an icon.

15. The method of controlling cursor movement of claim 13 further including the step of varying said lighting.

16. The method of controlling cursor movement of claim 15 wherein said lighting is varied dependent upon the type of designated region said cursor is within.

17. The method of controlling cursor movement of claim 15 wherein said light is varied in intensity.

18. The method of controlling cursor movement of claim 15 wherein said light is varied in color.

19. The method of controlling cursor movement of claim 13 further including the step of varying the light as the cursor approaches the designated region.

20. The method of controlling cursor movement of claim 19 wherein said light is varied by providing an intermittent light pattern varying as the cursor approaches the designated region.

21. A computer program having data structures included on a computer readable medium for controlling cursor movement on the display screen in a computer controlled user interactive display having a graphical user interface with a user activated cursor control device connected to said computer and movable in the four orthogonal directions, said computer program comprising:

means for converting said user activated orthogonal movements into cursor movements in said four orthogonal directions on said display screen, and means for providing a visual indication on said cursor control device when said cursor is within a designated region on said display screen.

22. The computer program for controlling cursor movement of claim 21 wherein said user activated cursor control device is a computer control mouse.

23. The computer program for controlling cursor movement of claim 22 wherein said means for providing a visual indication comprises a light on said computer control mouse.

24. The computer program for controlling cursor movement of claim 23 wherein said designated region on said display screen is an icon.

25. The computer program for controlling cursor movement of claim 23 further including means for varying said light.

26. The computer program for controlling cursor movement of claim 25 wherein said means vary the light dependent upon the type of designated region said cursor is within.

27. The computer program for controlling cursor movement of claim 25 wherein said light is varied in intensity.

28. The computer program for controlling cursor movement of claim 25 wherein said light is varied in color.

29. The computer program for controlling cursor movement of claim 23 further including means for varying the light as the cursor approaches the designated region.

30. The computer program for controlling cursor movement of claim 29 wherein said means vary the light by providing an intermittent light pattern varying as the cursor approaches the designated region.

* * * * *